United States Patent [19]

Rosenberry

[11] 4,392,072
[45] Jul. 5, 1983

[54] DYNAMOELECTRIC MACHINE STATOR HAVING ARTICULATED AMORPHOUS METAL COMPONENTS

[75] Inventor: George M. Rosenberry, Hendersonville, Tenn.

[73] Assignee: General Electric Company, Fort Wayne, Ind.

[21] Appl. No.: 942,009

[22] Filed: Sep. 13, 1978

[51] Int. Cl.³ .................. H02K 1/00; H02K 15/12
[52] U.S. Cl. ............................ 310/216; 310/43; 310/44; 310/254; 310/259
[58] Field of Search ............................ 310/42–44, 310/216–218, 254, 258, 259; 148/108, 121, 31.55; 336/213; 164/5, 423

[56] References Cited

U.S. PATENT DOCUMENTS

| | | | |
|---|---|---|---|
| B 521,044 | 2/1976 | Sims | 310/259 |
| 2,134,795 | 11/1938 | Myers | 310/44 X |
| 2,303,291 | 11/1942 | Moss | 310/259 |
| 2,361,748 | 10/1944 | Daiger | 310/43 X |
| 2,825,108 | 3/1958 | Pond | 22/200.1 |
| 2,879,566 | 3/1959 | Pond | 22/200.1 |
| 2,950,401 | 4/1962 | Evans | 310/44 |
| 3,188,505 | 6/1965 | Wiley | 310/259 |
| 3,320,451 | 5/1967 | Wiley | 310/259 |
| 3,591,819 | 7/1971 | Laing | 310/259 X |
| 3,827,141 | 8/1974 | Hallerbäck | 310/259 X |
| 3,856,513 | 12/1974 | Chen et al. | 75/122 |
| 3,881,542 | 5/1975 | Polk | 164/87 |
| 4,036,638 | 7/1977 | Ray | 75/123 |
| 4,059,441 | 11/1977 | Ray et al. | 75/174 |
| 4,067,732 | 1/1978 | Ray | 75/126 P |
| 4,116,728 | 9/1978 | Becker et al. | 148/121 |
| 4,155,397 | 5/1979 | Honsinger et al. | 164/423 X |

Primary Examiner—Mark O. Budd
Attorney, Agent, or Firm—Vale P. Myles

[57] ABSTRACT

A dynamoelectric machine stator is formed of an amorphous metal yoke or back iron portion, consisting of either a spirally wound coil of amorphous metal ribbon or an edge-wound helix of such ribbon in which the respective turns are stacked together to define a cylinder, in combination with a plurality of separately formed amorphous metal teeth that are mounted at spaced intervals on the interior surface of the yoke to define a plurality of spaced winding-receiving slots that each extend axially between pairs of the teeth. The teeth are each secured in operating position on the yoke by being both bonded directly to it and by the supporting relationship established between the teeth and abutting slot liners, energizing windings and a cured insulating coating which is applied to the stator after the energizing winding is positioned in the stator winding slots. In various disclosed embodiments of the invention a number of different tooth configurations and back iron arrangements are disclosed in combination with different arrangements of slot liners and energizing winding supports for holding the teeth in their respective fixed positions on the stator yoke.

9 Claims, 5 Drawing Figures

DYNAMOELECTRIC MACHINE STATOR HAVING ARTICULATED AMORPHOUS METAL COMPONENTS

The invention relates to stator structures for dynamoelectric machines and, more particularly, to a stator structure having an amorphous metal yoke on which a plurality of separately formed amorphous metal teeth are secured in arcuately spaced positions by a variety of holding means. A number of different stator tooth constructions are disclosed.

The use of amorphous metal alloys to form magnetic members in electrical power equipment such as dynamoelectric machines and power transformers is a relatively recent development. However, in the last few years, substantial strides have been made in developing techniques for manufacturing ribbons of amorphous metal material that are sufficiently long and wide to enable their use in making spirally wound cores and other structures that are useful in such machines. A significant aspect of this development work has been the discovery of a number of new amorphous metal alloys and metallic glass compositions that possess desirable physical, electrical and magnetic properties which are advantageously employable in the manufacture of dynamoelectric machines. In this regard, where the term amorphous metal is used hereinafter, it will be understood to encompass both amorphous metal alloys and metallic glass compositions.

The types of amorphous metal ribbon that are presently available commercially can be obtained in widths up to two inches, and in thicknesses of up to about two mils. One commercially available example of such a ribbon is sold under the tradename METGLAS® Alloy Ribbon 2826MB by Allied Chemical Corporation. That commercially available ribbon is a variation of a high induction amorphous metal alloy $Fe_{40}Ni_{40}P_{14}B_6$ and is suitable for making dynamoelectric machine stators. This characteristic of that alloy, and of other related alloys, is more fully described and claimed in co-pending U.S. patent application Ser. No. 719,914, which was filed on Sept. 2, 1976 and is now U.S. Pat. No. 4,116,728, issued Sept. 26, 1978, assigned to the same assignee as is the present invention.

Due to the thinness and ductility of amorphous metal strips that are available commercially, it does not appear to be practical to form desired geometric forms in them by conventional punching operations like those now used to punch winding-receiving slots in grain oriented silicon steel stator laminations that are crystalline in structure. A number of different solutions have been developed to cope with the problem of how to make such desired geometric patterns in amorphous metal ribbons. For example, in co-pending U.S. patent application Ser. No. 903,140, which was filed on May 5, 1978, now U.S. Pat. No. 4,155,397, which issued on May 22, 1979 there is disclosed and claimed a method for casting desired geometric configurations, such as winding-receiving slot configurations, in a continuous strip of amorphous metal ribbon that is subsequently edgewound into a cylindrical dynamoelectric machine stator. In co-pending U.S. patent application Ser. No. 914,446, which was filed on June 12, 1978, there is disclosed a method for mounting composite concentric cylinders of amorphous metal components to define "inside-out" winding-receiving slots in a dynamoelectric machine stator.

While those solutions are workable means for enabling the incorporation of amorphous metal materials into dynamoelectric machine stators, it remains desirable to provide a stator structure that is both more economical to manufacture and flexible in design. In particular, it would be desirable to provide a stator structure design that enables an amorphous metal stator to be constructed so that design considerations concerning the stator teeth can be made substantially independently from the design requirements for the stator yoke or back iron. In still another co-pending U.S. patent application, Ser. No. 942,852, filed contemporaneously with this application, there is disclosed and claimed a method and apparatus for constructing a stator structure of concentrically disposed cylinders of amorphous metal ribbons so that a stator back iron portion can be made independently from a stator tooth portion. Although the teaching of that application is not essential to an understanding of the present invention, that teaching is specifically included herein by reference, particularly with respect to the high magnetic induction types of amorphous metals disclosed therein as being suitable for making dynamoelectric machine stator components. The same types of amorphous metals and the processes for making them, as disclosed in that patent application, can be used in practicing the invention disclosed herein.

As is explained in patent application Ser. No. 942,852, one problem inherent in the manufacture of stator structures that incorporate a continuous amorphous metal ribbon having stator teeth laminations formed in it is the need to either precisely control the casting of such a tooth pattern or to wind the ribbon in a precise manner to assure appropriate alignment of the winding slots defined by the tooth laminations when they are stacked together as the ribbon is wound helically. It would be desirable to obviate the need for those precision manufacturing processes by providing a more flexible stator construction in which the stator teeth can be made in any of a number of different configurations and be mounted on a stator back iron portion without regard to how the back iron portion is wound.

Accordingly, a primary object of the present invention is to provide a dynamoelectric machine stator having articulated back iron and tooth components that readily enable the economical and efficient use of amorphous metal alloys in its fabrication.

Another object of the invention is to provide a dynamoelectric machine stator construction that can accommodate a variety of tooth configurations which are mounted to define winding-receiving slots on the inner diameter of the stator yoke.

Yet another object of the invention is to provide a dynamoelectric machine stator formed of articulated amorphous metal alloy components that are mounted in predetermined fixed relationship and supported therein by bonding means positioned between the components as well as by an energizing winding and slot liners in the stator assembly.

Additional objects and advantages of the invention will become apparent to those skilled in the art from the description of it that follows considered in conjunction with the accompanying drawings.

In a preferred embodiment of the invention a dynamoelectric machine stator is formed of either a helically or toroidally wound ribbon of amorphous metal that is arranged to form a back iron or yoke portion of the stator, and a plurality of amorphous metal teeth that are mounted at arcuately spaced points around the interior surface of the yoke portion to define a number of winding-receiving slots between the respective teeth. In different disclosed embodiments of the invention a variety of amorphous metal tooth structures are disclosed including laminated teeth stacked both axially and transversely to the tooth axes, toroidally wound teeth and molded tooth configurations formed of particles of amorphous metal and a bonding material. The teeth are each bonded in their fixed positions to the stator yoke and are further secured in their respective fixed positions by the supporting relationship established between them and the stator energizing winding. In addition, in some modifications of the invention, pre-formed slot liners are used to help support the teeth in their desired fixed relationship, and an insulating resin is cured on the overall assembly to further assist in securing the teeth in position.

Figure 1:
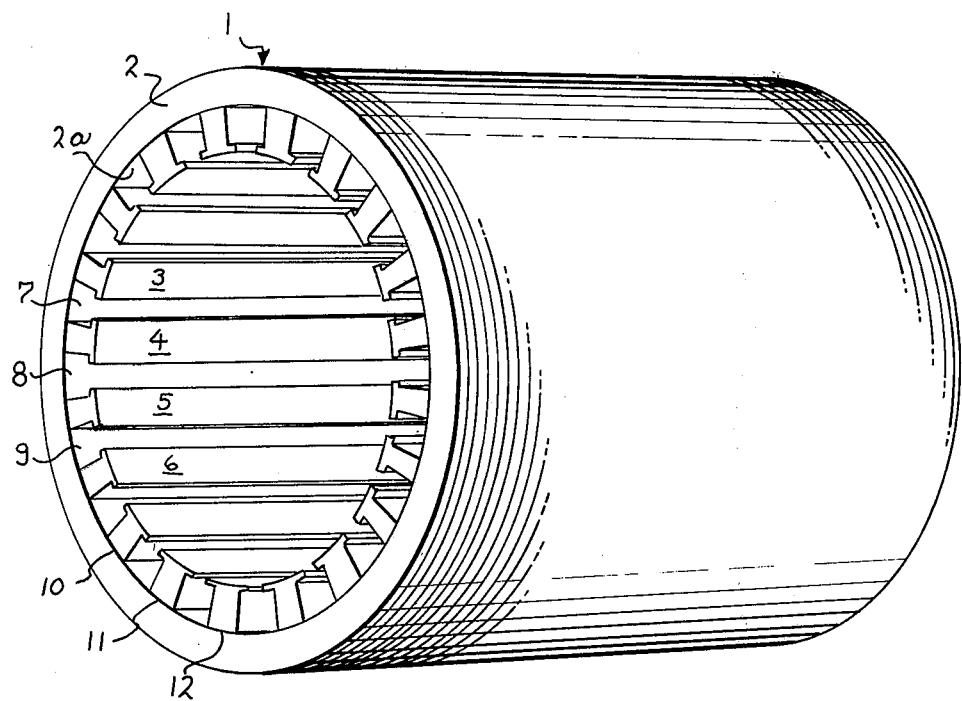
FIG. 1 is a perspective view of a dynamoelectric machine stator constructed of amorphous metal components according to the inventon. In this view the stator teeth are made up of pre-formed laminations that are stacked and bonded together, as shown.

Referring first to FIG. 1, there is shown a dynamoelectric machine stator 1 that is formed of a coil of amorphous metal alloy ribbon 2 which is arranged in the form of a cylinder of any desired length to form a given stator size. As mentioned above, commercially available high magnetic induction amorphous metal alloy ribbon can be obtained commercially in strips up to two inches in width and with a thickness of about two mils. In this embodiment of the invention such a ribbon of suitable pre-selected width is used to form the cylindrical back portion 2 of the stator 1. Such a ribbon is edge-wound (as explained in the following paragraph) in helical configuration to define the laminated stator yoke 2 and individual turns of this cylindrical yoke can either be separated by a coating of bonding and insulating resin or stacked directly on one another. In the latter case the designer would rely on an oxide coating that will be formed between the turns when they are annealed to provide sufficient inter-turn insulation to avoid excessive eddy current losses in the stator.

Any suitable manufacturing method may be used to form and wind the ribbon and cylindrical stator back portion 2, but one suitable method for forming such a ribbon is disclosed in co-pending U.S. patent application Ser. No. 914,444, filed on June 12, 1978, which issued July 8, 1980, as U.S. Pat. No. 4,211,944 and is assigned to the same assignee as the present invention. Another suitable method for edge-winding such a helical stator portion is disclosed in co-pending U.S. patent application Ser. No. 903,140, which was mentioned above.

An example of one type of high magnetic induction amorphous metal alloy that is suitable for forming the ribbon of the stator 1 is disclosed in U.S. Pat. No. 4,036,638 which issued on July 19, 1977. Other suitable alloys for making a stress-relieved stator are disclosed and claimed in co-pending U.S. patent application Ser. No. 719,914, which was filed on Sept. 2, 1976, and is assigned to the assignee of the invention disclosed herein.

To complete the structure of the stator 1 shown in FIG. 1, a plurality of articulated teeth 3, 4, 5, 6, etc., are mounted, respectively, at arcuately spaced intervals on the inner surface 2A of the cylinder 2 to define a plurality of axially extending winding slots 7, 8, 9, etc. between adjacent pairs of the teeth. Finally, a holding means 10 is used between each tooth and the stator yoke surface 2A for securing the teeth members in fixed relation to the cylindrical yoke 2. In this embodiment of the invention the holding means comprises a layer of a suitable commercially available epoxy resin, such as one of the commercially available resins now commonly used to insulate the laminations of conventional stators by well-known vacuum impregnation processes, which layer is positioned as indicated by the lines 10, 11 and 12, etc., at the base of each of the teeth. In alternative embodiments, a suitable polyester resin may be substituted for the epoxy resin. It will be understood that such a resin will normally be applied in an uncured state to either or both the surface 2A and the bases of the respective teeth before the teeth are positioned on the surface 2A, then the resin will be cured by an appropriate heating or aging process.

As will be more fully described hereinafter, the particular configuration of the amorphous metal teeth 3-6, etc. can take a number of different forms according to the invention. In the embodiment shown in FIG. 1, each of the teeth is made of a plurality of pre-formed laminations that are bonded together with a suitable resin, such as those indicated above for use in bonding the helical turns of the stator yoke 2 together. The laminations forming the teeth are disposed in planes substantially parallel to the end surfaces of the stator yoke 2, i.e., with each lamination in a plane that is essentially perpendicular to the longitudinal center axis of the stator 1. Some alternative tooth configurations will now be discussed in greater detail with reference to the other Figures of the drawing.

Figure 2:
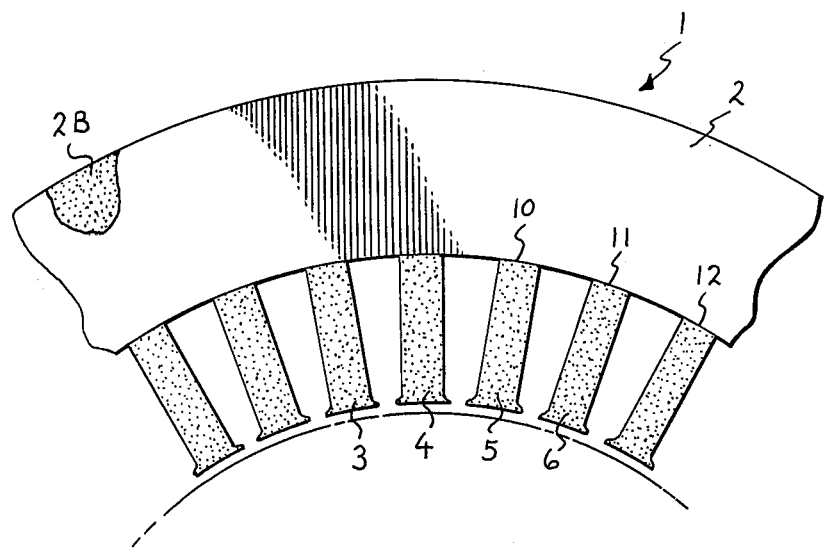
FIG. 2 is a side elevation of a portion of a stator similar to that shown in FIG. 1, but differing in that the teeth are formed of flakes of amorphous metal that are bonded together by a resin.

Considering, for example, the embodiment illustrated in FIG. 2, wherein reference numbers similar to those used in FIG. 1 are employed to designate like components, a portion of a stator 1 is shown formed of an edge-wound helical amorphous metal back iron portion 2 on which a plurality of amorphous metal teeth 3'-6' etc. are bonded. These teeth are secured at arcuately spaced points to the back iron portion 2 by holding means 10, 11, 12, etc., such as the above-described resin at the base of each of the teeth shown in FIG. 1. The characteristic feature of this embodiment of the invention is that each of the teeth 3'-6' etc. consists essentially of separate amorphous metal alloy particles, such as flakes or chips, that are secured in closely packed relationship by a suitable bonding material, such as one of the commercially available epoxy resins commonly used in conventional vacuum pressure impregnation processes for making laminated stators. The compaction factor of the metal particles in the bonding material will vary but should be made as high as possible while still providing at least a film of the bonding resin between a major portion of the adjacent particles in order to provide electrical insulation that keeps electrical conductivity between the particles negligibly low, thus assuring desirably low power losses in the teeth of the stator. The bonding material is used to hold the particles in fixed relationship within each of the teeth to define any desired tooth configuration, such as the molded, flared tooth shape shown in FIG. 2, that operates to help retain a stator winding positioned in the slots between the teeth. A relatively simple tooth cross-section pattern is preferred so that the teeth can be formed by conventional molding or extrusion processes in lengths that are sufficient to extend the full length of an associated stator yoke, such as the yoke 2 shown in FIGS. 1 and 2.

At this point, it will be noted that although the back portion 2 of the embodiment of the invention shown in FIG. 1 is an edge-wound helix of amorphous metal ribbon, it should be apparent that a toroidally wound ribbon of amorphous metal may also be used to form the back iron portion in this and other embodiments of the invention such as that shown in FIG. 2, in which flaked amorphous metal teeth bonded in a suitable resin are used.

In addition, in alternative forms of the invention, the yoke portion (2) of a stator, similar to the one shown in FIG. 2, can be formed by molding an annulus of suitably compacted amorphous metal flakes and binding resin, rather than using a wound ribbon of such metal to form the yoke. Subsequently, either molded teeth, such as those shown in FIG. 2, or pre-formed, stacked or wound teeth, such as those shown in other Figures of the drawing can be mounted on the molded stator by being bonded thereto with a bonding resin, as explained above. In order to illustrate that all or a portion of a stator yoke can be formed of highly compacted amorphous metal particles bonded in annular form with a generally cylindrical inner surface of the annulus formed to receive either a plurality of teeth, as explained above; or to have a toroid or helix of wound ribbon positioned therein, to form the remainder of the yoke, there is shown in FIG. 2 an area 2B of the yoke 2, which is representative of an embodiment of the invention in which such a molded yoke (2) is employed.

Figure 3:
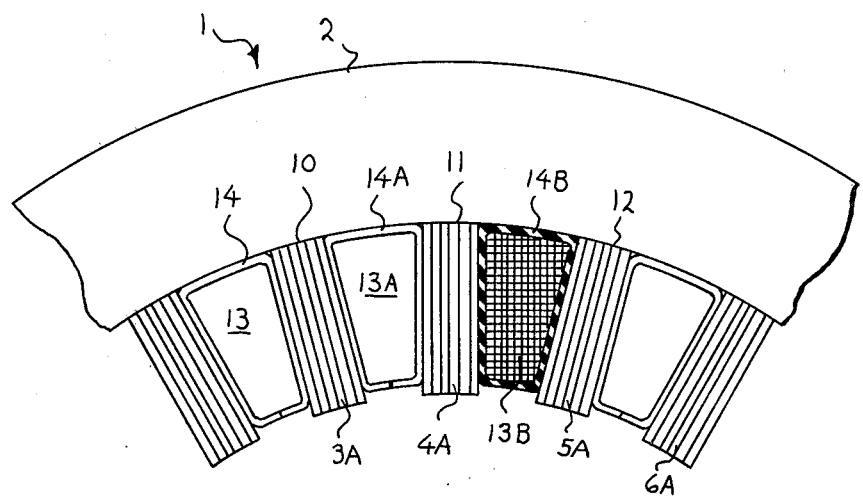
FIG. 3 is a side elevation of a portion of a dynamoelectric machine stator showing another alternative embodiment of a stator structure constructed according to the invention. In the embodiment illustrated in FIG. 3 the stator teeth are laminated axially and shown with respect to slot liners and stator winding turns that help support the teeth in fixed position.

Another form of the invention is illustrated in FIG. 3 where a portion of a stator 1 comprising an amorphous metal back iron portion 2 is provided with a plurality of articulated laminar amorphous metal teeth 3A–6A et cetera. Each of these teeth comprises a plurality of strips of amorphous metal ribbon that are pre-formed, stacked on one another and bonded together in their stacked relationship with a suitable bonding means such as the epoxy resin first described above. The individual strips in the teeth are in generally radial alignment with respect to radii of the stator and extend axially for the length of the yoke portion 2 to define winding-receiving slots between the teeth. In this form of the invention there is also illustrated additional holding means for securing the teeth members in fixed relation to the cylindrical yoke 2. The additional holding means comprise bundles of energizing winding turns 13, 13A, 13B, etc. for the stator, in combination with a plurality of winding slot liners 14, 14A, 14B, et cetera. Both the windings 13–13B, etc. and the slot liners 14–14B etc. are mounted in supporting relationship firmly against adjacent teeth 3A–6A, etc. to help support them in their respective desired fixed relationships on the back iron portion 2 of the stator 1. Finally, the tooth members 3A–6A etc. are bonded to the yoke portion 2 by coatings of suitable bonding resin 10, 11, 12 etc. at the base of the respective teeth members, as explained above, and the overall stator 1 is encapsulated in a suitable epoxy or polyester insulating resin (not specifically illustrated) that is subsequently cured in any well-known manner. For example, a suitable process for thus encapsulating the stator 1 in insulating resin is described in U.S. Pat. No. 3,904,785 to F. W. Baumann, which issued on Sept. 9, 1975 and is assigned to General Electric Company. Of course, a variety of different conventional slot liners can be used to perform a holding function for the teeth, such as that afforded by the tooth supporting slot liners 14–14B shown in FIG. 3, but, by way of example, a suitable resin impregnated slot liner for that purpose is described in U.S. Pat. No. 3,436,815-M. W. Sheets, which issued on Apr. 8, 1969 and is also assigned to General Electric Company.

Figure 4:
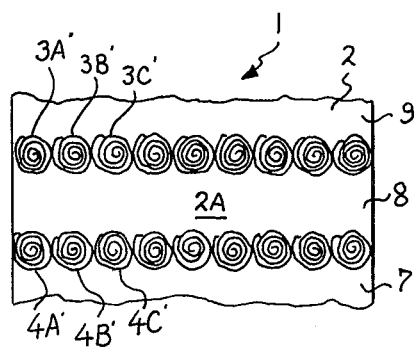
FIG. 4 is a plan view of a fragment of the inside surface of a dynamoelectric machine stator showing two rows of toroidally wound teeth mounted to define winding-receiving slots on the stator.

Next, there is shown in FIG. 4 yet another embodiment of the invention in which a portion of a stator 1, comprising a plurality of teeth mounted on a cylindrical amorphous metal back iron portion 2, that is a spirally wound ribbon forming a cylinder of approximately two inches in axial and radial extent. Winding-receiving slots 7, 8, 9, etc. are defined between rows of tooth members that are respectively made of individual spirally wound tooth cylinders 3A', 3B', 3C', etc., 4A', 4B', 4C', etc., and other similar spaced rows (not shown). Each of the tooth cylinders has its longitudinal axis disposed perpendicular to the inner surface 2A of the back portion 2. Thus, as can be clearly seen in FIG. 4, groups of the tooth cylinders 3A'–3C' etc.; 4A'–4C'; and so on, are arranged in spaced axial rows to define the axially extending winding slots 7, 8, 9, etc. between the adjacent rows. Again, a suitable holding means such as a commercially available epoxy resin is used to fasten each of the spirally wound tooth cylinders in fixed relationship in these rows on the surface 2A of the back iron portion 2.

Typically, as in all of the embodiments described herein, an electrical stator winding will be mounted on the stator 1, in the form shown in FIG. 4, with each of the axially extending sides of the winding disposed, respectively, in one of the winding slots 7–9 etc., and in engagement with the sides of the tooth members 3A'–3C' etc.; 4A'–4C' etc., thereby to support the tooth members in their fixed relationship between the stator slots. Of course, slot liners such as those shown in FIG. 3 may also be employed in the embodiment shown in FIG. 4.

Figure 5:
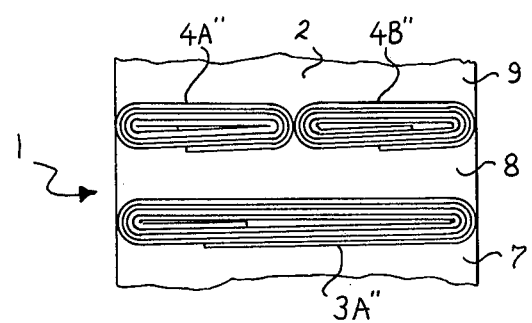
FIG. 5 is a plan view of a fragment of the inside surface of a dynamoelectric machine stator showing two rows of toroidally wound teeth that are mounted to define winding receiving slots on the stator. Each of the toroidally wound strips are flattened to a generally rectangular form, rather than being cylindrical as in the embodiment shown in FIG. 4.

It should be recognized that in practicing the invention with other forms of toroidally wound tooth members, rather than having a plurality of relatively small-diameter toroidal tooth cylinders, such as the cylinders 3A'–3C', etc. shown in FIG. 4, each tooth could be made of a single rectangularly shaped toroid 3A'', as illustrated in FIG. 5. Thus when such a tooth is glued into the stator back iron portion 2 between the sides of adjacent teeth it will form all, or a major part, of a tooth. An example of plural rectangularly shaped toroids 4A" and 4B" used to form parts of a tooth is shown on one side of the winding slot 8 in FIG. 5. The manufacture of such an elongated, or generally rectangular tooth, from a ribbon of amorphous metal can be accomplished by winding a multi-layered coil of the ribbon on a mandrel of generally circular shape, then flattening the loop into rectangular form and molding it in insulating resin to retain it in that form.

From the foregoing description of the invention those skilled in the art will recognize that still further alternative embodiments and modifications of it may be practiced without departing from the scope of the invention. Accordingly, it is intended to encompass within the following claims the true spirit and scope of the invention.

What is claimed as new and desired to be secured by Letters Patent of the United States is:

1. A dynamoelectric machine stator comprising a coil of amorphous metal alloy ribbon arranged to form a cylindrical yoke, a plurality of articulated teeth each separately mounted, respectively, at arcuately spaced intervals on the inner surface of said cylinder to define a plurality of axially extending winding slots between the teeth, each of said teeth comprising a formed body consisting essentially of amorphous metal particles and a bonding material for holding the particles in fixed relationship within said formed body, and holding means comprising a bonding material disposed between each tooth and the yoke for securing the teeth in fixed relation to said yoke.

2. A dynamoelectric machine stator comprising a coil of amorphous metal alloy ribbon arranged to form a cylindrical yoke, a plurality of articulated teeth each consisting essentially of articulated amorphous metal alloy particles and a bonding material for holding the particles in fixed relationship and each tooth being separately mounted, respectively, at arcuately spaced intervals on the inner surface of said cylinder to define a plurality of axially extending winding slots between the teeth, and holding means comprising a bonding material disposed between each tooth and the yoke for securing the teeth in fixed relation to said yoke, in combination with an electrical winding mounted on the stator, said winding having axially extending sides, each disposed, respectively, in one of said slots and in engagement with the teeth defining said slot thereby to support the teeth in said fixed relation.

3. A dynamoelectric machine stator comprising a coil of amorphous metal alloy ribbon arranged to form a cylindrical yoke, a plurality of articulated teeth each separately mounted, respectively, at arcuately spaced intervals on the inner surface of said cylinder to define a plurality of axially extending winding slots between the teeth, each of said teeth comprising at least one spirally wound strip of metallic glass ribbon, and holding means for securing the teeth in fixed relation to said cylinder.

4. A stator as defined in claim 3 wherein each of said teeth defines a cylinder and each cylinder is disposed with its longitudinal axis perpendicular to the inner surface of said stator.

5. A stator as defined in claim 4 wherein groups of said cylinders are arranged, respectively, in spaced axial rows to define axially extending winding slots between said rows.

6. A stator as defined in claim 3 wherein each spirally wound strip is formed generally as a rectangle, and each stator tooth includes at least one of said rectangularly formed strips.

7. A dynamoelectric machine stator comprising an annulus formed of amorphous metal particles and a molded bonding resin that fixes the particles in a highly compacted relationship with a film of resin separating a major portion of the particles from one another, said annulus being formed with a generally cylindrical inner surface, a plurality of articulated teeth each mounted, respectively, at arcuately spaced intervals on said inner surface of the annulus to define a plurality of axially extending winding slots between the teeth, and holding means for securing the teeth in fixed relation to said inner surface.

8. A stator as defined in claim 7 wherein each of said teeth comprises a plurality of amorphous metal ribbon laminations of predetermined configurations, stacked and bonded together with generally planar surfaces of each of the laminations substantially perpendicular to said inner surface.

9. A stator as defined in claim 7 wherein each of said teeth comprises a molded body of bonding resin and a plurality of amorphous metal particles held in fixed relation, with a high compaction factor, by the resin.

* * * * *